(12) United States Patent
Rosenthal et al.

(10) Patent No.: US 11,725,775 B1
(45) Date of Patent: *Aug. 15, 2023

(54) TOOLLESS MOUNTING OF ELECTRONIC DEVICES

(71) Applicant: Juniper Networks, Inc., Sunnyvale, CA (US)

(72) Inventors: Joshua Rosenthal, San Jose, CA (US); John James Musante, Holtsville, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,326

(22) Filed: May 6, 2022

Related U.S. Application Data

(63) Continuation of application No. 16/517,380, filed on Jul. 19, 2019, now Pat. No. 11,326,735.

(60) Provisional application No. 62/701,610, filed on Jul. 21, 2018.

(51) Int. Cl.
*F16M 11/00* (2006.01)
*F16M 13/02* (2006.01)
*E04B 9/00* (2006.01)

(52) U.S. Cl.
CPC ............. *F16M 13/02* (2013.01); *E04B 9/006* (2013.01)

(58) Field of Classification Search
CPC .............................. F16M 13/02; E04B 9/006
See application file for complete search history.

(56) References Cited

U.S. PATENT DOCUMENTS

| | | | |
|---|---|---|---|
| 3,589,660 A | 6/1971 | Dunckel | |
| 3,780,973 A | 12/1973 | Dalton, Jr. | |
| 4,603,829 A | 8/1986 | Koike et al. | |
| 4,890,428 A | 1/1990 | Platt | |
| 6,976,662 B2 | 12/2005 | Kump et al. | |
| 8,297,578 B2 | 10/2012 | Dittmer et al. | |
| 9,161,465 B2 | 10/2015 | Chen et al. | |
| 9,955,597 B1 | 4/2018 | Wu | |
| 10,161,565 B2 | 12/2018 | Wu | |
| 11,326,735 B1 | 5/2022 | Rosenthal et al. | |

(Continued)

OTHER PUBLICATIONS

Prosecution History from U.S. Appl. No. 16/517,380, now issued U.S. Pat. No. 11,326,735, dated Jun. 15, 2020 through Mar. 29, 2021, 49 pp.

*Primary Examiner* — Amy J. Sterling
(74) *Attorney, Agent, or Firm* — Shumaker & Sieffert, P.A.

(57) ABSTRACT

A mounting bracket for mounting an electronic device to the T-bar of a drop ceiling provides for self-locking snap-action securing of the mounting bracket to a flange of the T-bar, suspending the mounting bracket from the T-bar. The mounting bracket also provides for self-locking snap-action attachment of the mounted device to the bracket, suspending the device from the suspended mounting bracket. A split adapter allows vertical offsetting of the device from the ceiling, reducing vertical displacement of ceiling tiles resting on the T-bar. The split adapter has two halves the are laterally slid on to the T-bar flange and are then longitudinally slid together to be joined against lateral separation. The composite adapter thus formed presents an adapter flange to which the mounting bracket snap-secures, the mounting bracket locking the adapter halves against longitudinal separation.

20 Claims, 12 Drawing Sheets

(56) References Cited

U.S. PATENT DOCUMENTS

| | | | | |
|---|---|---|---|---|
| 2016/0374215 A1* | 12/2016 | Danicich | ............... | F16M 11/041 |
| 2017/0016463 A1* | 1/2017 | Koonce | .................. | F16M 13/02 |
| 2022/0243867 A1* | 8/2022 | Tsorng | ................... | H01Q 1/125 |

* cited by examiner

TOOLLESS MOUNTING OF ELECTRONIC DEVICES

CROSS-REFERENCE TO RELATED APPLICATION

This patent application is a continuation of U.S. Patent Application Ser. No. 16/517,380, filed Jul. 19, 2019, which claims the benefit of U.S. Provisional Patent Application No. 62/701,610, filed Jul. 21, 2018, the entire contents of each of which is incorporated herein by reference.

BACKGROUND

Drop ceilings are commonly used in commercial buildings. Such drop ceilings typically comprise a suspended grid of so-called T-bars that supports ceiling tiles in square or rectangular openings defined by the grid. The T-bars are often suspended from an obscured ceiling by wires. The drop ceiling T-bars are so called due their having a cross-sectional outline that is generally inverted T-shaped, comprising a vertically extending web and a horizontally extending flange at the bottom end of the web. The ceiling tiles rest on the top surfaces of the T-bar flanges.

It is often desirable to mount electronic devices (such as wireless access points, LED, or the like) on drop ceilings. Mounting is often achieved by connection directly to the T-bars, which usually results in the ceiling tiles being raised. This is particularly a problem where the ceiling tiles have recessed edges allowing the ceiling tile to extend out below the T-bar flange for a decorative look.

Mounting devices on such ceilings often require considerable operator skill and can be laborious, considering that the work is usually performed overhead.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
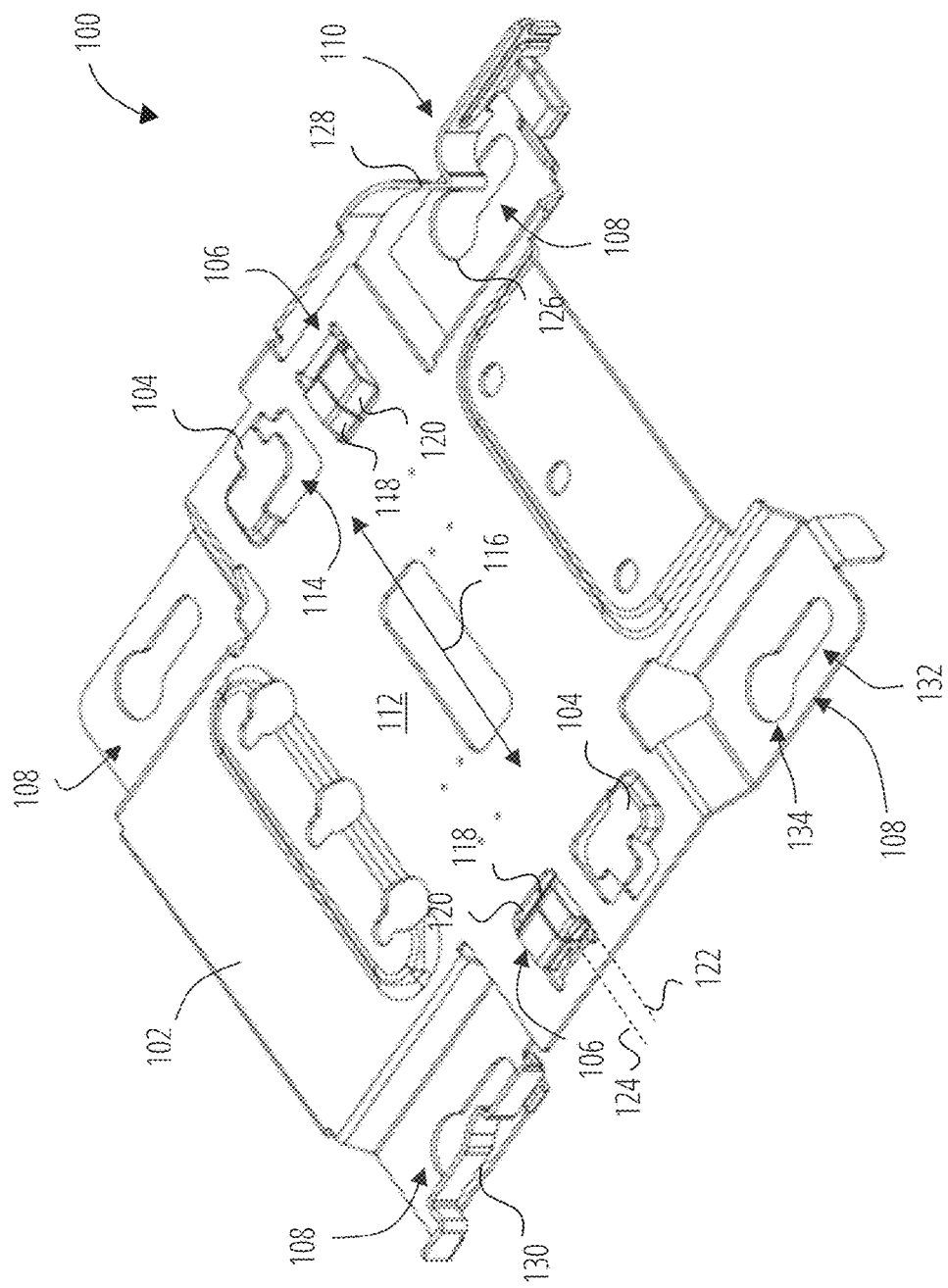
FIG. 1 shows a three-dimensional view of a mounting bracket 100 in accordance with one example embodiment.

This disclosure provides for brackets and bracket assemblies which can be snapped on to elongate structural supports such as drop ceiling T-bars for mounting electronic devices thereto. Some embodiments provide a bracket plate which can be snapped directly on to a T-bar. Other embodiments provide for a bracket adapter having two parts, in some instance being identical adapter halves, which can be slid and/or snapped together around the bottom of a T-bar. A slot formed by the two halves surrounds the bottom or flange of the T-bar and allows the bracket adapter to hang form the T-bar. Once slid together the sides of the bracket adapter lock together without the need for screws or other fashioners. The bracket adapter can slide along the bottom of the TBar while suspended from the T-bar, allowing for easy positioning of the device to be mounted.

Some embodiments provide a bracket plate or mounting bracket can be secured directly to a T-bar or one to the bracket adapter. In some such embodiments, heads of screws protruding from a device (e.g., an access point or other device to be hung form the ceiling) can be inserted through screw holes in the bracket plate and then the access points and screws can be slid in screw slots to a position where a non-return spring secures the screw heads so that they cannot slide back towards the screw holes, thus retaining the screws in the screw slots. The screw heads support the weight of the access point or other device to which the screws are attached.

The mounting plate in some embodiments includes raised hanger tabs and sprung shoulders. The flange of the T-bar is placed under the raised hanger tabs while the sprung shoulders are depressed. After alignment of the T-bar in recesses formed by the hanger tabs, the sprung shoulders snap back up and keep the T-bar flange in position under the raised hanger tabs.

One aspect of the disclosure provides a mounting bracket comprising:
  a bracket body;
  a toolless fastening mechanism incorporated in the bracket body, the fastening mechanism being configured to enable releasable toolless securing of the bracket body to an elongate flange of a structural support such that the bracket body is suspended from the flange; and
  a toolless attachment mechanism incorporated in the bracket body and configured to enable releasable toolless securing of a mounted device to the bracket body, so that the mounted device is suspended from the flange via the bracket body.

"Toolless" securing of two components to one another means that the components are securable together without the use of any fastener or tool external to or not integrated with the components before their engagement with one another. As such, an auto-locking mechanism in which one or more elements secure components together by sprung snap action, as described in some embodiments with reference to the drawings, provide for toolless securing together of the relevant component. "Securing" together of two or more components means that the relevant components cannot be separated by simple movement of the components relative to one another. Thus, for example, when relative movement of two components are prevented by depressible lock shoulder, the components are secured together in that depression of the lock shoulder is required to separate the components by relative movement. A "mounted device" refers to a device mountable by means of the mounting bracket, regardless of whether or not the device is currently secured to the bracket. Thus, a wireless access point mountable by the mounting bracket, for example, is referred to as the mounted device both before and after its actual mounting.

In some embodiments, the bracket body comprises a bracket plate, the attachment mechanism for attachment of the mounted device to the bracket plate comprising:
- a plurality of openings extending through the bracket plate for receiving respective connectors projecting from the mounted device, each connector comprising a shank and an enlarged head at an end of the shank furthest from the mounted device, each opening comprising:
    - an insertion hole shaped and sized to permit passage of the corresponding mounting formation head transversely therethrough; and
    - a slot that extends from the insertion hole to allow travel along the slot of the shank of one of the connectors received therein, the slot preventing passage of the mounting formation head transversely therethrough; and
- a latch mechanism associated with at least one of the plurality of openings to automatically trap the shank of the corresponding connector responsive to travel of the shank from the insertion hole along the slot beyond a locking position, the latch mechanism thereafter preventing travel of the trapped shank along the slot towards the insertion hole.

In this context, "bracket plate" means a member of rigid sheet material (e.g., being of plate metal), but is not limited to components that are perfectly flat, lying wholly in a single plane. Thus, the bracket plate may in some embodiments be contoured to have bumps, plateaus, depressions, or the like. "Transverse" refers to a direction that is transverse to the relevant longitudinal direction, as defined above, and that is substantially parallel to a plane in which a flange to which a device is to be mounted lies. Thus, in instance in which mounting is to a substantially horizontally extending T-bar, transverse means a substantially horizontal direction transverse to the length of the T-bar.

In one embodiment, no more than a single one of the plurality of openings has a latch mechanism associated therewith. The latch mechanism may comprise a non-return spring member that is mounted on the bracket plate to coincide with the slot of the associated opening and that is configured to:
- deform resiliently responsive to travel of the connector shank along the slot away from the insertion hole, allowing movement of the shank past the locking position; and
- after movement of the shank past the locking position, return resiliently to obstruct movement of the shank past the non-return spring member towards the insertion hole.

The fastening mechanism for securing the bracket body to the flange may comprise:
- a hanger tab that defines a flange recess configured for reception of a first longitudinal edge of the flange by insertion thereof into the flange recess in a direction that is transverse to a lengthwise direction of the flange and that is substantially parallel to a plane in which the flange lies, thereby to suspend the bracket body from the flange;
- a lock shoulder mounted on the bracket body such that, when the first longitudinal edge of the flange is received in the flange recess of the hanger tab, the lock shoulder stands proud of the bracket body adjacent an opposite, second longitudinal edge of the flange to prevent retraction of the flange from the hanger tab by contact of the second longitudinal edge of the flange against the lock shoulder, the lock shoulder being resiliently depressible to allow sliding of the flange over the lock shoulder during reception of the first longitudinal edge in the flange recess of the hanger tab; and
- a biasing mechanism that resiliently biases the lock shoulder against depression thereof and towards a raised condition, thereby enabling automatic return of the lock shoulder to the raised condition when the second longitudinal edge of the flange clears the lock shoulder.

As used herein, "substantially " means for the most part; essentially; in substance. Thus, for example, description as two elements as being substantially parallel or co-planar include not only instances in which the elements are perfectly parallel or co-planar, but also includes instances in which the elements are almost, virtually, or practically parallel or co-planar. In this context, "lengthwise direction " refers to a substantially transverse direction, as defined below, relative to the longitudinal direction of a support to which a device is to be mounted. "Longitudinal " refers to a direction substantially parallel with the lengthwise direction of an elongate element to which a component is to be connected. Thus, in the context of attachment to a T-bar or rail, longitudinal means substantially parallel to the lengthwise direction of the rail or T-bar, while in the context of attachment to a composite adapter as disclosed herein, longitudinal means substantially parallel to the lengthwise direction of an adapter flange provided by the composite adapter.

In some embodiments, the lock shoulder comprises a universal lock shoulder having two transversely spaced shoulder segments that are independently depressible and that are biased to their respective raised conditions, thereby enabling the universal lock shoulder to provide substantially play-free lateral abutment for flanges of two different widths. As used herein, "universal" means not that the relevant part can accommodate any other part, but that it can accommodate a plurality of differently sized and/or shaped parts. Thus, for example, describing a mounting formation on a bracket adapter as being universal means that the it can be mounted on two or more differently shaped and/or sized elongated supports, for example being capable of mounting on a T-bar or a rectangular rail, being mountable on T-bars with two different width flanges, and the like.

The hanger tab in some embodiment forms part of a pair of hanger tabs spaced and oriented to receive the opposite longitudinal edges of the flange at longitudinally spaced positions, so that the bracket body is attachable to the flange by, while the bracket body is positioned such that the flange recesses of the pair of hanger tabs are substantially co-planar with the flange, rotational movement of the bracket body about an axis substantially normal to the plane of the flange. In some such embodiments, the lock shoulder forms part of a pair of lock shoulders positioned for location on opposite sides of the flange, the lock shoulders being spaced apart such that each lock shoulder is in longitudinal register with and transversely opposed to a corresponding one of pair of lock shoulders.

The fastening mechanism may comprise:
a first pair of lock shoulders and an associated first pair of hanger tabs configured for together securing the bracket body such that the flange is oriented in a first direction relative to the bracket body; and
a second pair of lock shoulders and an associated second pair of hanger tabs configured for together securing the bracket body such that the flange is oriented in a second direction relative to the bracket body, the first direction and the second direction being transverse to one another.

Another aspect of the disclosure prides a kit for a bracket assembly to suspend a mounted device from an elongate structural support, the kit comprising:
a pair of adapter parts that are configured for toolless connection to one another to form a composite adapter, each adapter part having a respective mounting formation configured for lateral reception therein of at least part of the elongate structural support such as to so suspend the composite adapter from the structural support when both mounting formations are engaged with the structural support;
a mounting bracket that comprises:
a bracket body;
a fastening mechanism incorporated in the bracket body and configured to suspend the bracket body from the composite adapter; and
an attachment mechanism incorporated in the bracket body and configured to suspend the mounted device from the bracket body.

In some embodiments, the mounting bracket may be as a mounting bracket according to the first aspect of the disclosure. The pair of adapter parts may together define a joining mechanism configured to enable toolless joining together of the pair of adapter parts and to resist lateral separation of the adapter parts, thereby to form the composite adapter. Instead, or in addition, the fastening mechanism may be configured to enable releasable toolless securing of the bracket body to the composite adapter. Instead, or in addition, the attachment mechanism may be configured to enable releasable toolless securing of the mounted device to the bracket body.

The mounting formations of the composite adapter in some embodiments provide a universal mounting mechanism configured to be mountable to both of two differently sized and/or shaped elongate structural supports. In some such embodiments, the mounting mechanism is configured to accommodate a first T-bar type having a flange of a first standard width, and to accommodate a second T-bar type having a flange of a second standard width different from that of the first T-bar type. Instead, the universal mounting mechanism may be configured to accommodate a flange of an inverted T-bar, and is configured to accommodate a rail having a rectangular cross-section profile.

In some embodiments, the bracket assembly kit may be configured such that the mounting formations of the composite adapter is configured for engagement with a T-bar flange of a substantially horizontally oriented T-bar, the composite adapter defining an adapter flange substantially parallel to and vertically spaced from the T-bar flange. In such embodiments, the fastening mechanism of the mounting bracket may be configured for engagement with the adapter flange to suspend the bracket body from the composite adapter.

Another aspect of the invention provides a bracket assembly formed by a kit as described above. Yet a further aspect of the invention provides a method of mounting a device on a structural support by use of the disclosed mounting bracket and/or bracket assembly.

Turning now to the embodiments illustrated in the drawings, the description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

FIG. 1 shows a mounting bracket 100 for mounting an electronic device to an elongated structural support, according to one example embodiment. As will be described in further detail below, the mounting bracket 100 is in this example embodiment configured for mounting a wireless access point (AP) device (e.g., AP device 500, FIG. 5) to a structural support in the form of a T-bar 206 (FIG. 2) that forms part of a drop ceiling 202 (FIG. 2), so that the AP device 500 is suspended from a horizontally extending T-bar flange 208 forming part of the T-bar 206.

As can be seen in FIG. 1, the mounting bracket 100 has a rigid body provided by a bracket plate 102 of stamped mild steel, having a generally rectangular outline. The bracket plate 102 has incorporated therein (a) a fastening mechanism for securing the bracket plate 102 to the T-bar flange 208, and (b) an attachment mechanism for securing the AP device 500 to the bracket plate 102. As will be described in more detail below, the fastening mechanism for suspension of the bracket plate 102 from the T-bar 206 in this example embodiment comprises a toolless auto-locking mechanism comprising a pair of hanger tabs 104 and a complementary pair of universal lock shoulders 106. The attachment mechanism for suspending the AP device 500 from the bracket plate 102 is in this embodiment a toolless auto-locking mechanism comprising a set of screw openings 108 and a latch mechanism 110 associated with a particular screw opening 108, further referred to as the latch opening 126.

Turning first to the fastening mechanism for securing the bracket plate 102 to the T-bar flange 208, it will be seen that the pair of hanger tabs 104 and the pair of universal lock shoulders 106 are provided on a flat central portion 112 of the bracket plate 102 such as to stand proud of an operatively upper face of the bracket plate 102. The upper face of the central portion 112 is in use brought into contact with the underside of the T-bar flange 208 during connection of the bracket plate 102 to the T-bar 206. The bracket plate 102 is thus oriented substantially horizontally when installed on a horizontal T-bar 206. For ease of description, the terms horizontal and vertical are in this description used non-restrictively to describe spatial relationships between different components, but it will be appreciated that, in some embodiments, the bracket plate 102 can be oriented differently.

Each hanger tab 104 comprises a punched raised portion that stands proud of the flat central portion 112, extending horizontally and being vertically spaced from the central portion 112 of the bracket plate 102 to define a flange recess 114 for receiving therein part of the T-bar flange 208, so that the bracket plate 102 hangs from the T-bar flange 208 by the hanger tab 104. Each hanger tab 104 is oriented such that it opens laterally, facing towards a longitudinal centerline of the bracket plate 102 in a direction that is lateral or transverse relative to a longitudinal direction 116 along which the T-bar flange extends when received in the pair of hanger tabs 104. Each hanger tab 104 resists movement of the T-bar flange 208 into its flange recess 114 beyond a point at which the longitudinal edge of the T-bar flange 208 abuts laterally against the respective formation that provides the hanger tab 104.

The hanger tabs 104 are longitudinally spaced, to engage the T-bar flange 208 at different respective longitudinal positions, but face in opposite lateral directions and are transversely spaced to receive opposite longitudinal edges of the T-bar flange 208. In other words, one of the hanger tabs 104 in use receives a longitudinal edge of the T-bar flange 208, while the other hanger tab 104 receives the other, opposite longitudinal edge of the T-bar flange 208.

Each hanger tab 104 is paired with a respective universal lock shoulder 106, so that each universal lock shoulder 106 is in longitudinal register with the corresponding hanger tab 104, being transversely spaced therefrom to be located on an opposite side of the T-bar flange 208 when it is received in the hanger tab 104. The universal lock shoulders 106 are referred to as being universal in that they are configured for accommodating T-bar flanges 208 of two distinct widths. To this end, each universal lock shoulder 106 comprises two independently depressible and independently sprung shoulders (in this example embodiment indicated as a laterally inner shoulder 118 and a laterally outer shoulder 120) which are transversely space to be located side-by-side. For ease of description, the sprung auto-locking functionality provided by the universal lock shoulder 106 for releasable toolless securing to the T-bar 206 will first be described with reference to the functioning of the inner shoulder 118 considered in isolation.

Each inner shoulder 118 is in this example embodiment a protrusion stamped from the mild steel of the bracket plate 102, being integral with and standing proud of the upper surface of the central portion 112 of the bracket plate 102 when in an unstressed, raised condition (as is the case in FIG. 1). The inner shoulder 118 is, however, resiliently depressible, having a biasing mechanism that resiliently biases it to the raised condition. In this example embodiment, the biasing mechanism of the inner shoulder 118 (and likewise of the outer shoulder 120) is provided by elastic deformation and return of the spring steel material (in this case stainless steel SUS301) of which it is formed. The inner shoulder 118 is positioned such that its laterally inner edge extends longitudinally and is transversely spaced from the associated hanger tab 104 by a distance corresponding to a particular standard flange width. The laterally inner edge of the inner shoulder 118 is indicated in FIG. 1 by longitudinally extended dotted line 122.

As will be described greater depth below with reference to FIG. 3 and FIG. 4, depressibility of the universal lock shoulder 106 permits engagement of the hanger tabs 104 with the T-bar flange 208. In particular, the universal lock shoulders 106 are resiliently depressed when pushed against the underside of T-bar flange 208, after which the bracket plate 102 is rotated to slide the opposite longitudinal edges of the T-bar flange 208 into the respective flange recesses 114 of hanger tabs 104. When the associated longitudinal edge of the T-bar flange 208 clears inner shoulder 118 (that is, when the flange edge is aligned with the longitudinal direction 116 of the bracket plate 102 and is located laterally inside dotted line 122), the inner shoulder 118 snaps or springs resiliently back to the raised condition. The raised inner shoulder 118 is then in close lateral abutment with the longitudinal edge of the T-bar flange 208, preventing lateral extraction of the T-bar flange 208 from the associated hanger tab 104. The fastening mechanism provided by the hanger tabs 104 and the universal lock shoulders 106 thus provide a releasable toolless mechanism for securing mounting bracket 100 to the T-bar 206. Differently defined, the fastening mechanism is auto-locking or is a sprung mechanism configured for snap-locking the bracket plate 102 to the T-bar 206.

Figure 8:
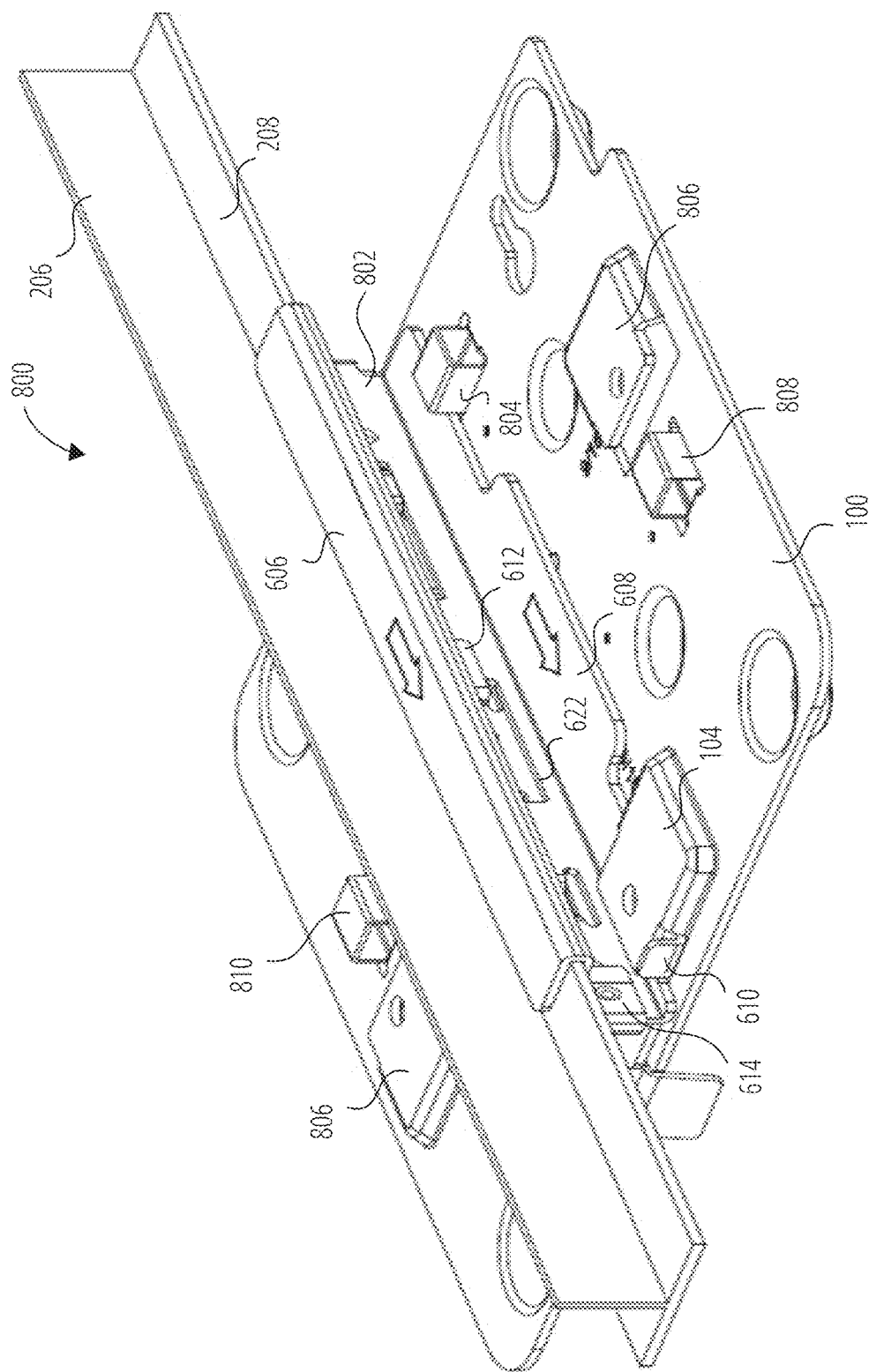
FIG. 8 is a three-dimensional view of a bracket assembly connected to a T-bar according to one embodiment.

The outer shoulder 120 functions identically to that described above with respect to the inner shoulder 118, except that it is configured to laterally secure a T-bar flange 208 of greater width than that which is to be secured by the inner shoulder 118. In particular, the outer shoulder 120 is configured for cooperation with a T-bar flange 208 having a width corresponding more or less to the lateral distance represented in FIG. 1 between the laterally outer extremity of the frontmost hanger tab 104 and dotted line 124. It will be appreciated that when such a wider T-bar flange 208 is engaged with the fastening mechanism (i.e., so that the associated longitudinal edge of the flange is closely spaced laterally inwards of dotted line 124), the inner shoulder 118 remains in its depressed condition and continues to bear against the underside of the T-bar flange 208, even though the outer shoulder 120 has snapped back to the raised condition to lock the bracket plate 102 in position on the T-bar flange 208. In other embodiments, the fastening mechanism and may be configured for accommodating a single flange width. Referring briefly to FIG. 8, it will be seen that the mounting bracket 100 in that example embodiment has a single unitary lock shoulder 804 associated with each hanger tab 104.

Turning now to the attachment mechanism for securing the AP device 500 to the mounting bracket 100, the attachment mechanism, as mentioned, in this example embodiment comprises four screw openings 108 and a latch mechanism 110 located at that one of the screw openings 108 which provides the latch opening 126. The screw openings 108 are located in respective depressions or landings located at the corners of the generally rectangular bracket plate 102. The depressions are vertically offset from the flat central portion 112 of the bracket plate 102 to allow vertical clearance for screwheads 504, as will be described below.

Each screw opening 108 is broadly keyhole-shaped, having an elongated screw slot 132 extending rectilinearly from an enlarged insertion hole 134. The screw openings 108 are shaped, sized, and spatially arranged for receiving corresponding connectors forming part of or attached to the device to be mounted by means of the mounting bracket 100. In this example embodiment, the connectors of the mounted device are provided by four screws 502 (see FIG. 5) screwed into complementary holes provided on the AP device 500. Each screw 502 has, in conventional fashion, a screwhead 504 and a threaded screw shank 506. The screws 502 are shoulder screws, being configured to, upon being tightened to the AP device 500, come to a stop in a position that leaves a gap from the bottom of the screwhead 504 to the AP device 500, so that part of the screw shank 506 is exposed to allow reception thereof the a corresponding screw slot 132. Note that, in other embodiments, the connectors can be provided by formations integrally formed with the mounted device.

The screw openings 108 are thus shaped, sized, and positioned to receive the respective screws 502 by an operator lifting the AP device 500 vertically to pass each screwhead 504 through the corresponding insertion hole 134, and thereafter sliding the bracket plate 102 horizontally in the direction of the screw slots 132. Each screw shank 506 thus slides along the corresponding screw slot 132, so that the AP device 500 is suspended from the mounting plate 102 by the screwheads 504, being prevented from vertical separation by virtue of the fact that the diameter of the screwhead 504 is larger than the width of the screw slot 132.

The latch mechanism 110 associated with the latch opening 126 is configured to trap or capture the corresponding screw 502 in the corresponding screw slot 132, preventing return of the associated screw 502 to the insertion hole 134 to allow vertical removal of the screw 502 from the latch opening 126. It will be appreciated that although only a single one of the screw openings 108 has associated therewith a latch mechanism 110, the shape and spatial arrangement of the screw openings 108 prevents disengagement of any one of the screws 502 from its associated screw opening 108 while the latch mechanism 110 retains its associated screw 502 in its locked position.

The latch mechanism 110 in this example embodiment comprises a non-return spring 128 provided by a shaped metal strip that is bent to form a kink coinciding with the screw slot 132 of the latch opening 126. As can best be seen in FIG. 1, the non-return spring 128 is shaped such that it is relatively gently inclined relative to the screw slot 132 in a connecting direction extending from the insertion hole 134 to the distal end of the screw slot 132. Thus, when the screwhead 504 is received through the insertion hole 134 and the bracket plate 102 is slid horizontally such that the screw shank 506 travels along the screw slot 132 from the insertion hole 134, the non-return spring 128 is pushed sideways by the screwhead 504 to allow passage of the screwhead 504 past the kink. The non-return spring 128 thus deforms elastically, snapping resiliently back to its unstressed position (as shown in FIG. 1) once the screwhead 504 has passed the locking position defined by the kink of the non-return spring 128. The kink of the non-return spring 128 is shaped, however, to block passage of the screwhead 504 back to the insertion hole 134, so that the non-return spring 128 obstructs movement of the screw shank 506 along the screw slot 132 in the direction opposite to the connecting direction mentioned before.

In this manner, the screw openings 108 and latch mechanism 110 is configured for toolless securing of the AP device 500 to the mounting bracket 100. Worded differently, the fastening mechanism is auto-locking or is a sprung mechanism configured for snap-locking the AP device 500 to the mounting bracket 100.

The mounting bracket 100 further includes a bracing spring 130 associated with one of the screw openings 108. The bracing spring 130 functions similarly to the non-return spring 128, except that it does not obstruct passage of the corresponding screwhead 504 past it in either direction. Instead, the bracing spring 130 bears resiliently against the screwhead 504 in a direction transverse to the screw slot 132 to reduce play and thus tighten the connection provided by the fastening mechanism.

Figure 2:
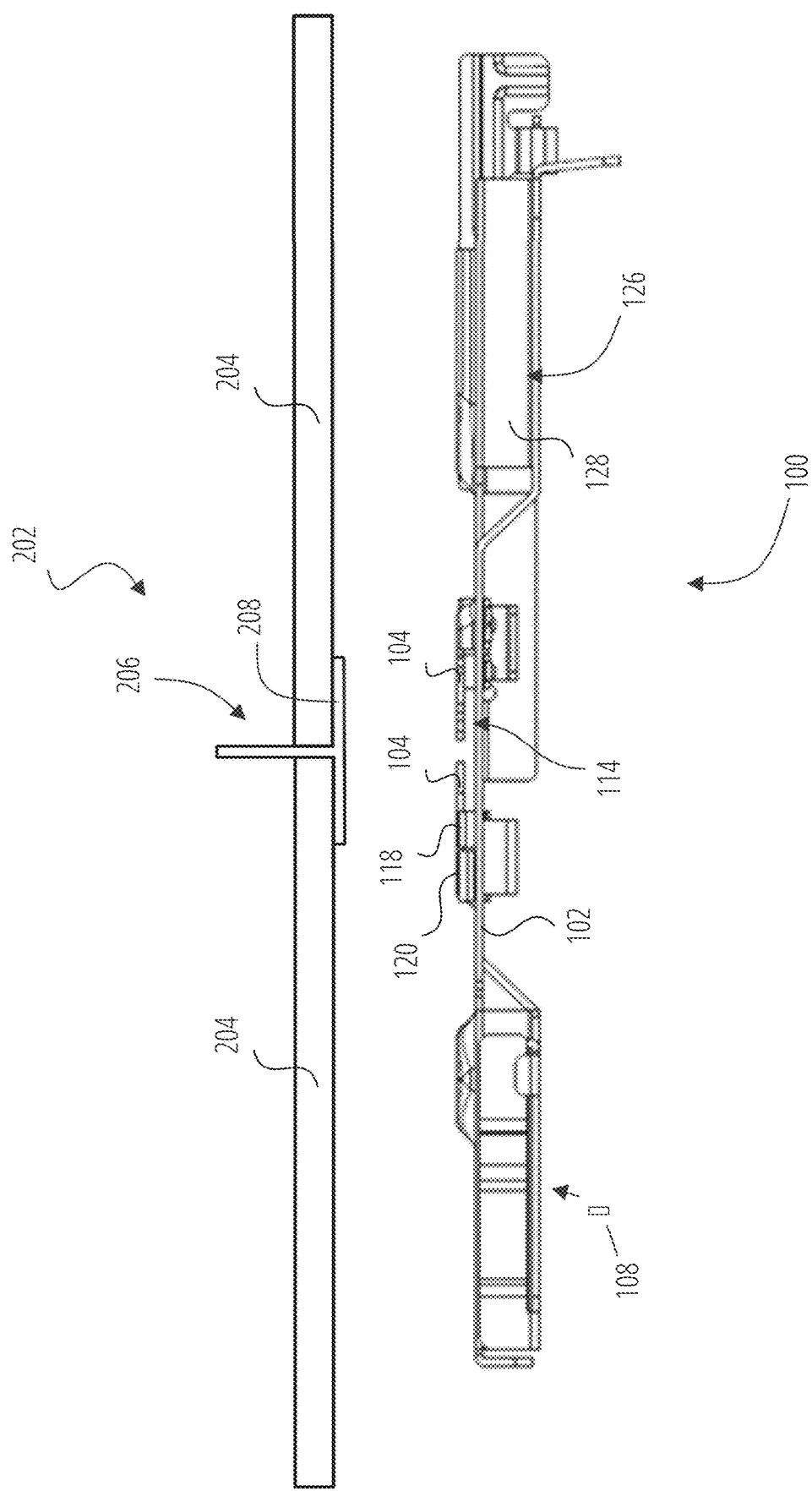
FIG. 2 shows a side view of an installation comprising a drop ceiling 202 to which an electronic device is to be mounted by user of a mounting bracket in accordance with one example embodiment.

Use of the mounting bracket 100 in operation will now briefly be described with reference to FIG. 2 to FIG. 5. FIG. 2 shows a cross-sectional view of a drop ceiling 202 to which the mounting bracket 100 is about to be secured. The drop ceiling 202 comprises a grid of inverted T-bars 206, one of which is shown in cross-section in FIG. 2. The T-bar 206 has a horizontal extending T-bar flange 208, the upper surface of which supports a peripheral edge of each adjacent ceiling tile 204.

To suspend the mounting bracket 100 from the drop ceiling 202, the T-bar flange 208 is to be engaged with the hanger tabs 104 such that each longitudinal edge of the T-bar flange 208 is received in respective one of the flange recesses 114 defined by the respective hanger tabs 104. To this end, the mounting bracket 100 is first lifted by the operator so that the bracket plate 102 is substantially horizontal and located beneath the T-bar 206. Because the hanger tabs 104 are oriented in different directions, however, they cannot simply be slid linearly into engagement with the T-bar flange 208. Instead, connection of the mounting bracket 100 to the T-bar flange 208 is by rotational movement of the bracket plate 102 about a substantially vertical axis. The operator then rotates or turns the bracket plate 102 in the direction of arrow 302 (FIG. 3) about a central vertical axis so that each of the edges of the T-bar flange 208 slides laterally into the corresponding flange recess 114 until the universal lock shoulders 106 at least partially snap back to the raised condition (FIG. 4), locking the bracket plate 102 to the T-bar flange 208. In this example embodiment, the flange width is such that only if the outer shoulder 120 of the respective universal lock shoulder 106 stand proud of the upper surface of the bracket plate 102 for securing the bracket plate 102 against disengagement from the hanger tabs 104 by which the bracket plate 102 is suspended from the T-bar flange 208.

Figure 3:
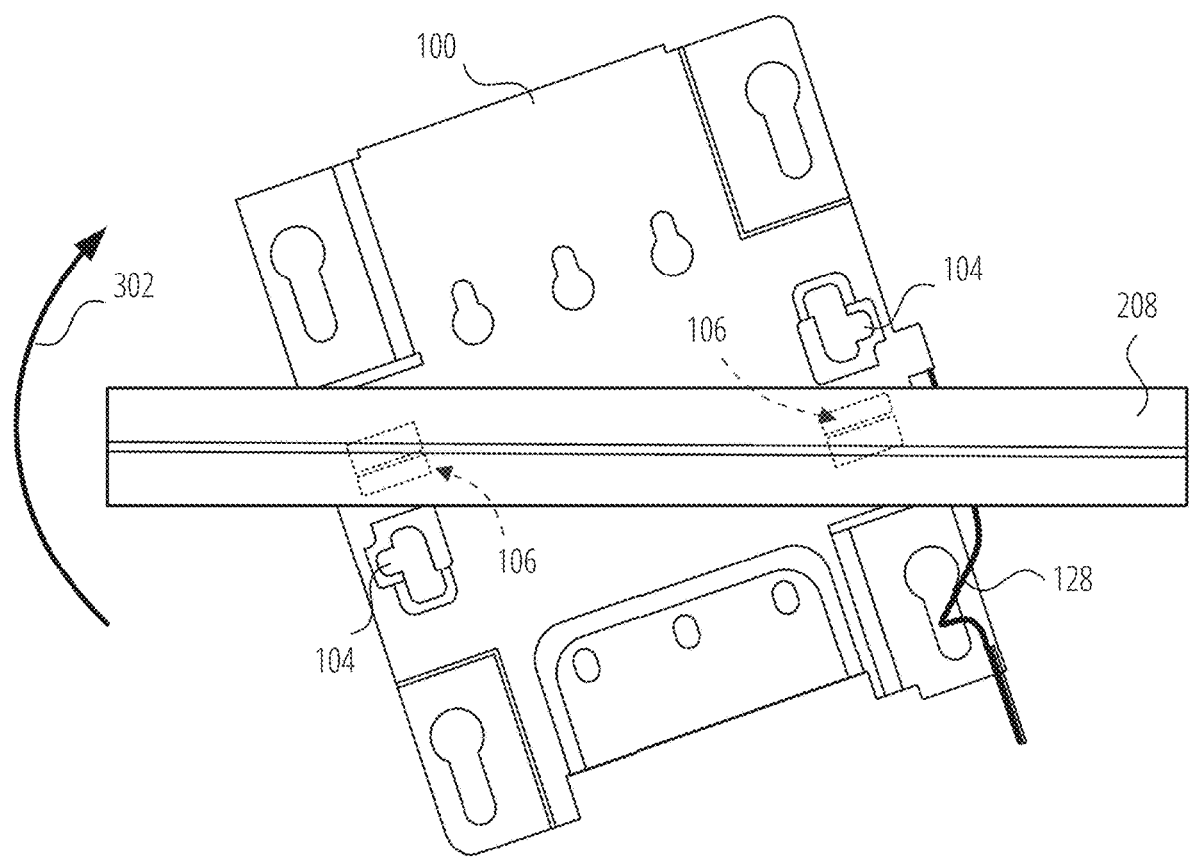
FIG. 3 shows a schematic top view of a first operation in connection of a mounting bracket to a T-bar, according to one embodiment.
Figure 4:
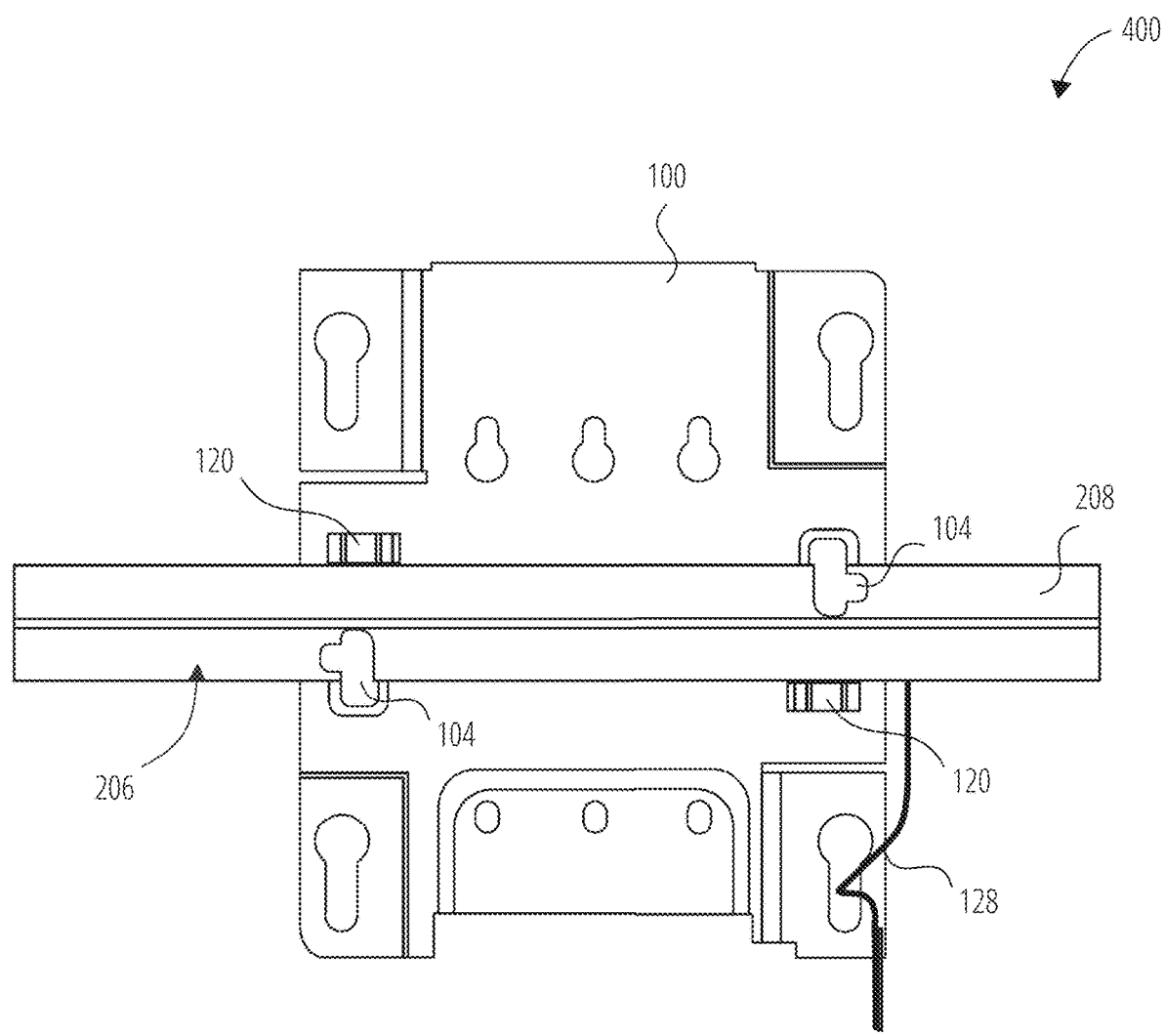
FIG. 4 shows a view corresponding to FIG. 3, with the mounting bracket having been secured to the T-bar.

Turning now to FIG. 3, it will be seen that the bracket plate 102 is first turned by the operator such that the T-bar flange 208 is in vertical alignment with both of the universal lock shoulders 106. The operator then (while the bracket plate 102 is in the rotated position shown in FIG. 3) pushes the bracket plate 102 upwards into forced contact with the underside of the T-bar flange 208. Such forced contact pushes down the universal lock shoulders 106 until the underside of the T-bar flange 208 is in flush contact with the flat central portion 112 of the bracket plate 102. In this position, the T-bar flange 208 is substantially coplanar with the flange recesses 114 defined by the hanger tabs 104.

The operator then rotates or turns the bracket plate 102 in the direction of arrow 302 (FIG. 3) about a central vertical axis so that each of the edges of the T-bar flange 208 slides laterally into the corresponding flange recess 114 until the universal lock shoulders 106 at least partially snap back to the raised condition (FIG. 4), locking the bracket plate 102 to the T-bar flange 208. In this example embodiment, the flange width is such that only if the outer shoulder 120 of the respective universal lock shoulder 106 stand proud of the upper surface of the bracket plate 102 for securing the bracket plate 102 against disengagement from the hanger tabs 104 by which the bracket plate 102 is suspended from the T-bar flange 208. Note that the fastening mechanism thus described is toolless, in that no tool or fastener external to the mounting bracket 100 is used either to suspend the mounting bracket 100 from the T-bar 206 (which is effected by the hanger tabs 104) or to secure the connection of the bracket plate 102 to the T-bar flange 208 (which is effected by the auto-lock snap action of the universal lock shoulder 106). Instead, the entire described connection and securing of the mounting bracket 100 to the T-bar flange 208 is achieved by purely manual operations.

Figure 5:
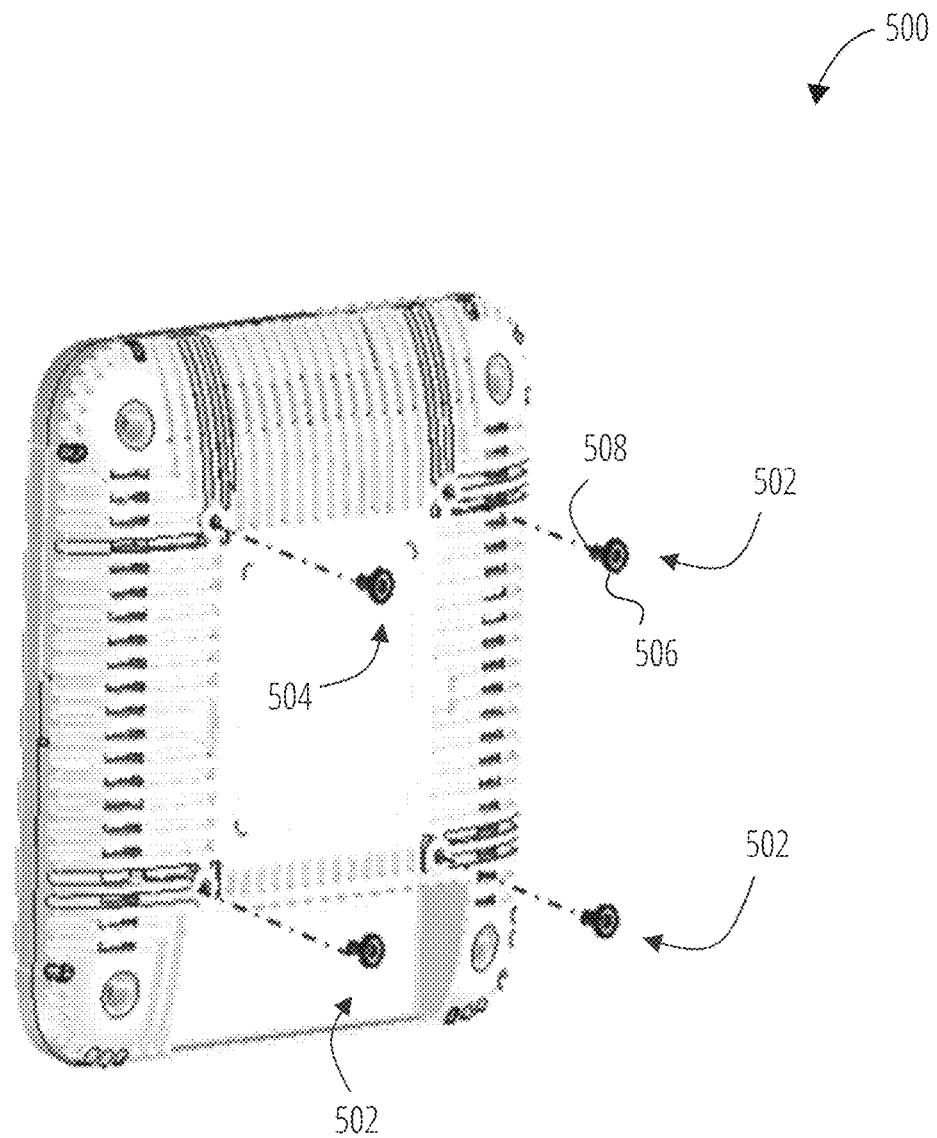
FIG. 5 illustrates an electronic device to be mounted to a T-bar by a mounting bracket in accordance with one embodiment.

Thereafter, the AP device 500 is attached to the suspended mounting bracket 100 by the attachment mechanism provided by the screw openings 108 and the latch mechanism 110. In this example embodiment, the screws 502 are screwed into the corresponding holes on an operatively upper surface of the AP device 500, as illustrated in FIG. 5. As mentioned, the screws 502 can in some embodiments be pre-assembled with the AP device 500, or analogous headed studs may be formed integrally with the AP device 500. Note that although the screws 502 can in some embodiments require use of a tool such as a screwdriver or Allen key for connection to the AP device 500, the attachment mechanism is nevertheless a toolless securing mechanism as understood in this description. This is because no tool or external fastener is necessary for attachment and locking or securing of the AP device 500 to the mounting bracket 100 subsequent to its first engagement with the mounting bracket 100, connection of the screws 502 to the AP device 500 being preparatory to engagement of the AP device 500 with the mounting bracket 100.

Figure 9:
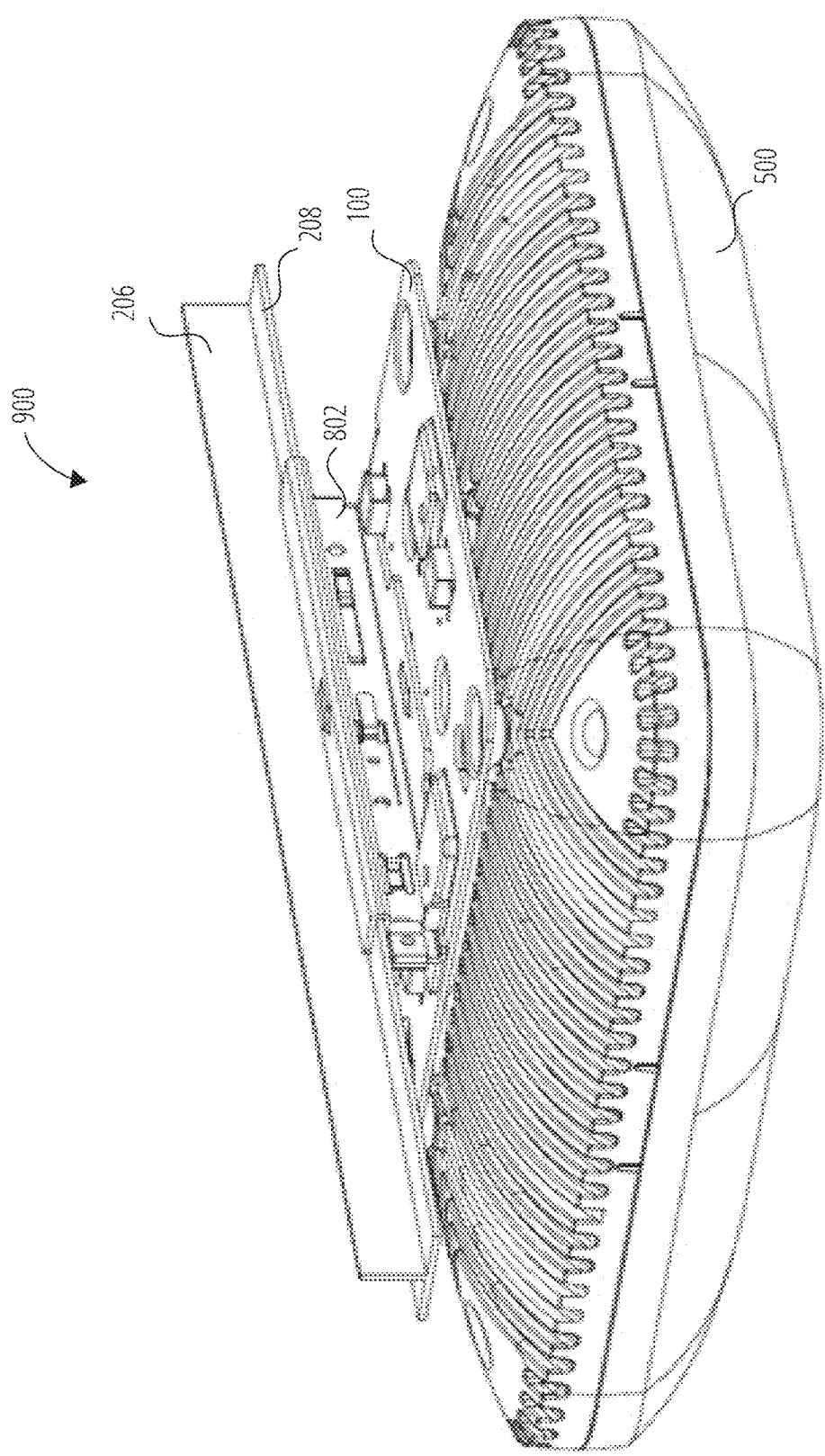
FIG. 9 is a three-dimensional view of an installation comprising a device mounted to a drop ceiling T-bar by a bracket assembly, according to one example embodiment.

The device assembly provided by the AP device 500 and attached screws 502 is thereafter attached to the suspended mounting bracket 100 by, as described previously: orienting the AP device 500 horizontally; aligning the four screws 502 with the corresponding insertion holes 134 of the screw openings 108; lifting the AP device 500 such that the screwheads 504 pass vertically through the respective insertion holes 134; and thereafter sliding the AP device 500 horizontally in the direction of the screw slots 132 until the screw 502 in the latch opening 126 passes the kink in the non-return spring 128, at which point the non-return spring 128 snaps back and prevents return of the corresponding screw 502 to the insertion hole 134, thereby securing the suspended engagement of the AP device 500 with the mounting bracket 100. Referring briefly to FIG. 9, therein is shown an assembly in which an AP device 500 is attached and secured to the mounting bracket 100 in this manner (although the mounting bracket 100 is in the example embodiment of FIG. 9 suspended to the T-bar 206 via an adapter 802, as will be described).

Note again that the attachment mechanism for attaching and securing the AP device 500 to the mounting bracket 100, as described, is toolless, in that no tool or fastener external to the mounting bracket 100 or the mounted device assembly, as brought into engagement with the mounting bracket 100, is used either to suspend the AP device 500 from the bracket plate 102 (which is effected by the screws 502 pre-assembled to the AP device 500), or to secure the attachment of the AP device 500 to the bracket plate 102 (which is effected by the auto-lock snap action of the latch mechanism 110).

Note further that both the described toolless fastening mechanism (for fastening mounting bracket 100 to T-bar 206) and attachment mechanism (for attaching AP device 500 to mounting bracket 100) are releasable to allow selective disconnection. Thus, the AP device 500 can be removed from the mounting bracket 100 by manually pushing the non-return spring 128 sidewise to clear the corresponding screw slot 132, and thereafter sliding the AP device 500 horizontally such that the screw 502 in the latch opening 126 moves past the kink in the non-return spring 128, allowing withdrawal of the screwheads 504 from the screw openings 108. The mounting bracket 100 can likewise be disengaged from the T-bar 206 by depressing the universal lock shoulders 106 and thereafter rotating the bracket plate 102 in the direction opposite arrow 302 (FIG. 3), causing the underside of the T-bar flange 208 to slide over the lock shoulders 108 and causing sliding lateral withdrawal of the edges of the T-bar flange 208 from the flange recesses 114 of the hanger tabs 104.

One benefit of the described techniques is that the described mechanism for mounting a device such as the AP device 500 on a structural support such as drop ceiling T-bar 206 can be performed with relatively little effort compared to existing techniques. Instead, the mounting bracket 100 is snapped on to the T-bar 206, and the AP device 500 is snapped on to the mounting bracket 100. Despite such ease of installation, the connections provided by the mounting bracket 100 is no less secure than is the case in conventional methods. Moreover, the installation can be performed without tools, and more quickly than other with other methods.

With reference to FIG. 6 through FIG. 9, a bracket assembly 800 (FIG. 8) according to one example embodiment will now be described, the bracket assembly 800 including a mounting bracket 100 analogous to that described with reference to FIG. 1 through FIG. 5. Note that like reference numerals in the drawings indicate like or analogous parts, and that the all elements indicated by the same reference numeral are not necessarily identical. Referring briefly to FIG. 8, it will be seen that the bracket assembly 800 is configured to securely suspend a device (again represented by the example AP device 500) from a drop ceiling T-bar 206, except that the mounting bracket 100 is connected to a split bracket or composite adapter 802 hung from the T-bar flange 208.

Figure 6:
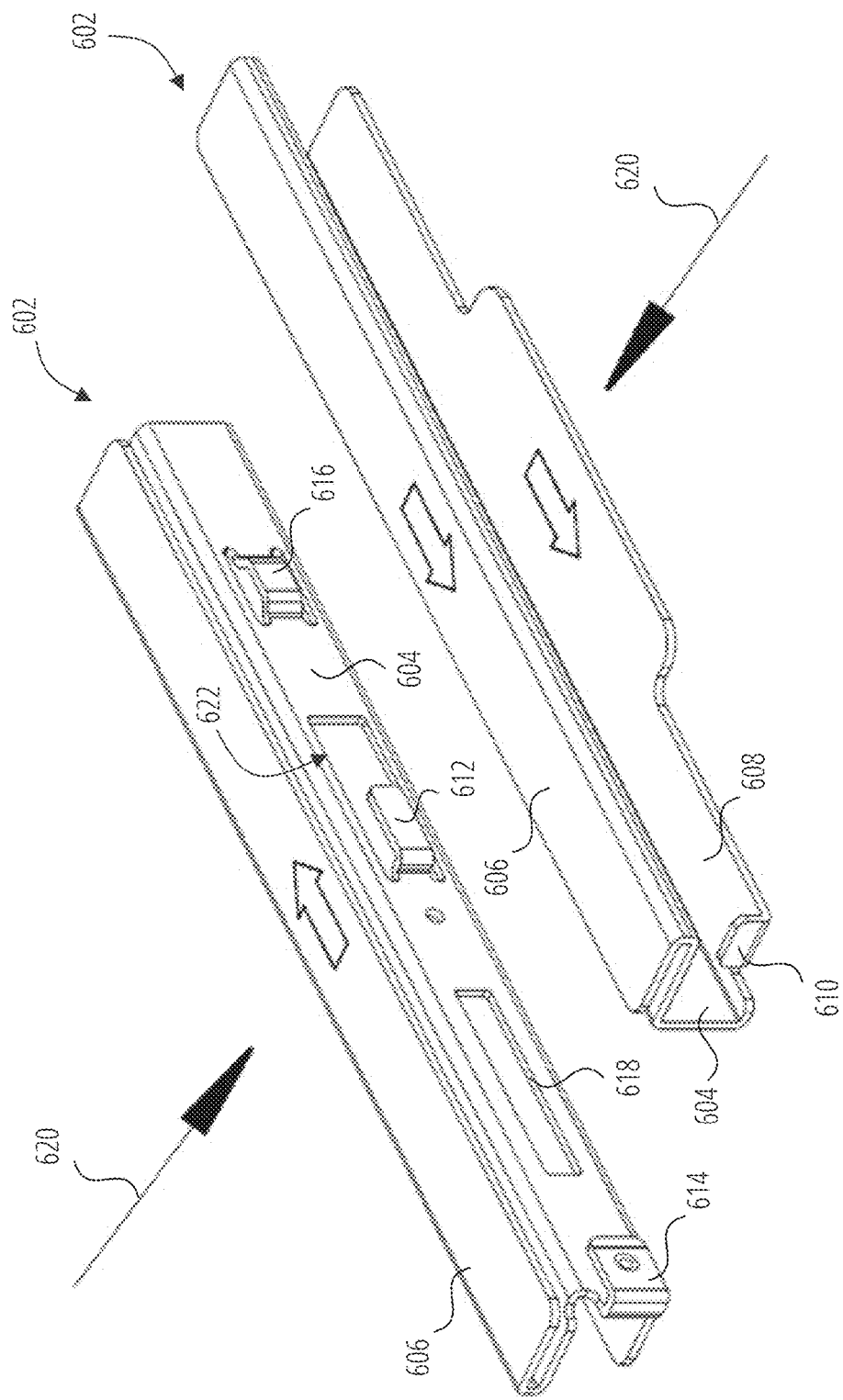
FIG. 6 is a three-dimensional view of a pair of adapter halves that are connectable together to form a composite adapter for a bracket assembly, according to one example embodiment.

Turning now FIG. 6, therein is shown two adapter parts that form part of the bracket assembly 800 and that are configured for connection together to form the composite adapter 802, further referred to simply as adapter 802. The adapter parts are in this example embodiment identical and are thus referred to as adapter halves 602. Each adapter half 602 is a part of folded mild steel, having a central web 604 that is operatively oriented vertically to extend longitudinally parallel to the T-bar 206. At the top of the web 604 is defined a mounting formation for engagement with a respective longitudinal edge of the T-bar flange 208 for suspension from the T-bar 206. In this example embodiment, the mounting formation comprises a laterally inwardly directed channel shaped and sized to receive by lateral insertion therein one side of a standard 15/16"T-bar 206.

Each adapter half 602 further defines at the bottom edge of the web 604 a respective laterally projecting part of an adapter flange 608 that is together provided by the halves 602, when connected together, for engagement by the mounting bracket 100 in a manner similar to that described with reference to connection of the mounting bracket 100 directly to the T-bar flange 208 in the example embodiment of FIG. 1 through FIG. 5. Each adapter half 602 defines at a longitudinal end of its adapter flange 608 a respective locking element in the form of a raised lip 610. As will be described later, the lip 610 co-operates in the final bracket assembly 800 with a corresponding one of the hanger tabs 104 to lock the adapter halves 602 together against longitudinal separation.

Each adapter half 602 further defines parts of a joining mechanism to enable toolless connection of the adapter halves 602 to resist lateral separation of the halves 602. In this example embodiment, the joining mechanism includes a cantilevered joint tab 612 formed from a punched portion of the web 604 to be parallel to and laterally inwardly spaced from the web 604. A cutout 622 in the web 604 is positioned immediately in front of the joint tab 612 for receiving the joint tab 612 of the other adapter half 602. Remembering that the adapter halves 602 are identical and that the joint tab 612 obscured in FIG. 6 faces longitudinally in the direction opposite to the exposed joint tab 612, it will be seen that the joint tabs 612 are configured for hooking on the web 604 adjacent the opposing joint tab 612 when the webs 604 are in lateral abutment and the halves 602 are slid together. When thus engaged, lateral separation of the adapter halves 602 is prevented by hooked engagement of the joint tabs 612 with the web 604. (See in this regard, for example, FIG. 10).

The joining mechanism further comprises a stop hook 614 at an end of each web 604, the stop hook 614 being shaped and oriented to receive the corresponding end of the other web 604 when the halves 602 are slid together. The stop hook 614 thus serves not only to stop relative longitudinal movement of the adapter halves 602 when they are brought fully into transverse register, but also resists lateral separation of the halves 602 at their respective longitudinal extremities.

Yet further, the joining mechanism provides co-operating formations to resist relative rotation of the adapter halves 602 about a transverse axis, in this embodiment comprising (a) a protrusion 616 that projects laterally inwardly from the web 604, and (b) a complementary slot or longitudinally extending window 618 in the web 604, being sized and positioned to allow partial extension therethrough of the protrusion 616 of the other adapter half 602. Location of each protrusion 616 in the corresponding window 618 prevents relative rotation of the adapter halves 602 about their joint formed by the joint tabs 612.

In use, the adapter halves 602 are first positioned on opposite sides of the T-bar 206, being longitudinally misaligned and oriented such that the recesses of the channels 606 are substantially co-planar with the T-bar flange 208. Then the halves 602 are brought laterally together in the respective directions indicated by arrows 620. When thus brought into lateral contact, the respective side edges (i.e., the longitudinal edges) of the T-bar flange 208 are received sidewise (i.e., laterally) into the respective channels 606. Further, the opposed laterally inner surfaces of the webs 604 are brought into flush contact. The adapter halves 602 are longitudinally positioned such that, upon being brought together, each lateral protrusion 616 is received in the window 618 of the other adapter half 602 adjacent an end of the window 618 furthest from the stop hook 614 of the adapter half 602 that defines that window 618. Yet further, each joint tab 612 is passed through the corresponding cutout 622, thus to be located laterally on the further side of the web 604.

Figure 7:
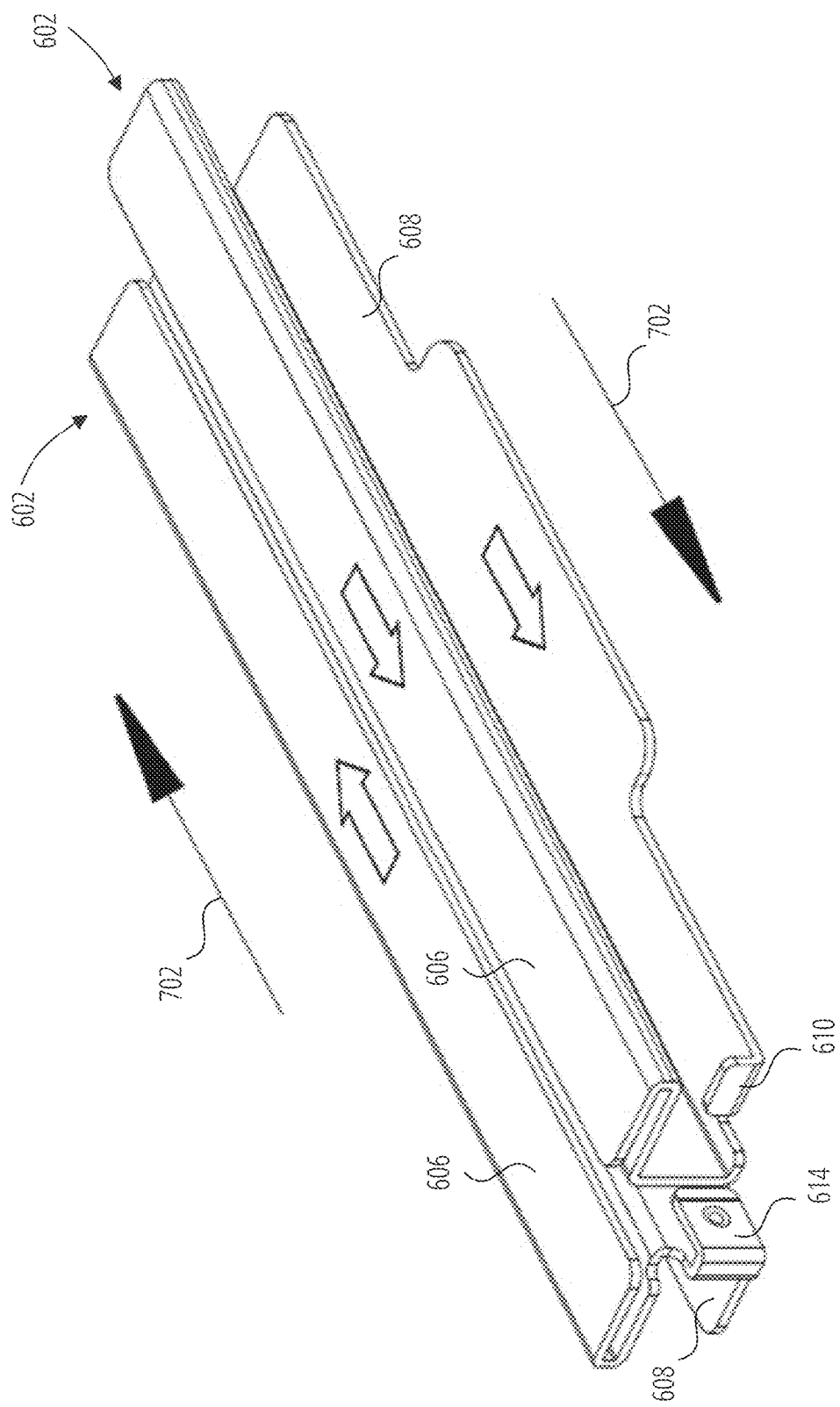
FIG. 7 is a view corresponding to FIG. 6, showing the adapter halves brought into lateral contact, according to one embodiment.

The adapter halves 602 are now in the position illustrated in FIG. 7 (from which the T-bar 206 is omitted for simplicity of illustration). Then, the adapter halves 602 are joined by being slid longitudinally relative to one another, as indicated by arrows 702. Responsive to this longitudinal sliding, the joint tabs 612 hook onto the web 604 of the other adapter half 602 at the longitudinal end of the corresponding cutout 622. Each lateral protrusion 616 slides longitudinally along the cooperating window 618 towards the end of the window 618 closest to the associated stop hook 614. The horizontally extending edges of the protrusion 616 closely abuts the horizontal edges of the complementary window 618 not only to guide the linear sliding movement but also, when joining is completed, to resist relative vertical movement of the adapter halves 602 at the protrusion 616 (as can best be seen in FIG. 10). Longitudinal sliding connection is continued until the end of the web 604 is brought into contact with the stop hook 614, at which point the adapter halves are in full longitudinal register and are joined together against lateral separation, forming the composite adapter 802 (FIG. 8).

Thereafter, the mounting bracket 100 is connected to the adapter 802 by engagement with the adapter flange 608 in a manner similar to that described with reference to a T-bar flange 208 with reference to FIG. 2 through FIG. 5, thus producing the bracket assembly 800 illustrated in FIG. 8. Earlier description of the releasable, toolless snap-connection of the mounting bracket 100 to the T-bar flange 208 thus applies mutatis mutandis to connection of the mounting bracket 100 to the composite adapter 802. An additional feature of the bracket assembly 800, however, is that the hanger tabs 104 serve the additional purpose of acting as a locking element for locking together the adapter halves 602. As can be seen in FIG. 8, the lip 610 on the adapter flange 608 hooks in behind the corresponding hanger tab 104 when the mounting bracket 100 is rotated into position. Thus, the lips 610 engaged with the respective hanger tabs 104 resist longitudinal separation of the adapter halves 602 in a direction opposite to the connecting direction (represented by arrows 620 in FIG. 6). In this manner, the adapter halves 602 are locked together by mounting bracket 100. Additionally, the mounting bracket 100 is longitudinally secured to the adapter flange 608 by the co-operating lips 610 and hanger tabs 104. Recall that the mounting bracket 100 is secured to the composite adapter 802 by operation of the sprung lock shoulders, in the example of FIG. 8 being provided by non-universal unitary lock shoulder 804. Also note that, for clarity of illustration, the screw openings 108 and latch mechanism 110 are not shown in FIGS. 8 and 9.

Thereafter, as shown in FIG. 9, the AP device 500 is attached to the mounting bracket 100 as described before, forming installation 900 in which the AP device 500 is securely suspended from the T-bar 206 via the bracket assembly 800 provided by the pair of adapter halves 602 and the mounting bracket 100.

It is a benefit of the bracket assembly 800 as described that it allows for easy connection to the T-bar flange 208 necessitating raising of ceiling tiles 204 by essentially no more that the width of the plate steel from which the channel 606 is formed. Moreover, connecting together of the adapter halves 602 and securing thereof by the mounting bracket 100 is again a releasable toolless operation.

A number of differences between the between the mounting bracket 100 of FIG. 8 and the mounting bracket 100 of FIG. 1 are briefly noted. First, as mentioned, the mounting bracket 100 of FIG. 8 is configured for attachment to flanges of only a single width (particularly, the width of the adapter flange 608), having a single unitary lock shoulder 804 rather than a universal lock shoulder as provided by element 106 in FIG. 1. Further, the fastening mechanism of mounting bracket 100 of FIG. 8 is configured to allow mounting on two co-planar T-bars 206 at normal to one another. Thus, the described pair of hanger tabs 104 and associated pair of lock shoulders 804 is configured for securing the bracket plate 102 to a first flange extending in a first direction, namely the lengthwise direction of the adapter flange 608 shown in FIG. 8. The mounting bracket 100 of FIG. 8, however includes a second pair of hanger tabs 806 and a second pair of lock shoulders 808 configured for securing the bracket plate 102 to a second flange extending in a second horizontal direction that is normal to the illustrated adapter flange 608. One benefit is that it permits attachment of the mounting bracket 100 to both T-bars at an intersection thereof in a grid of T-bars.

Figure 10:
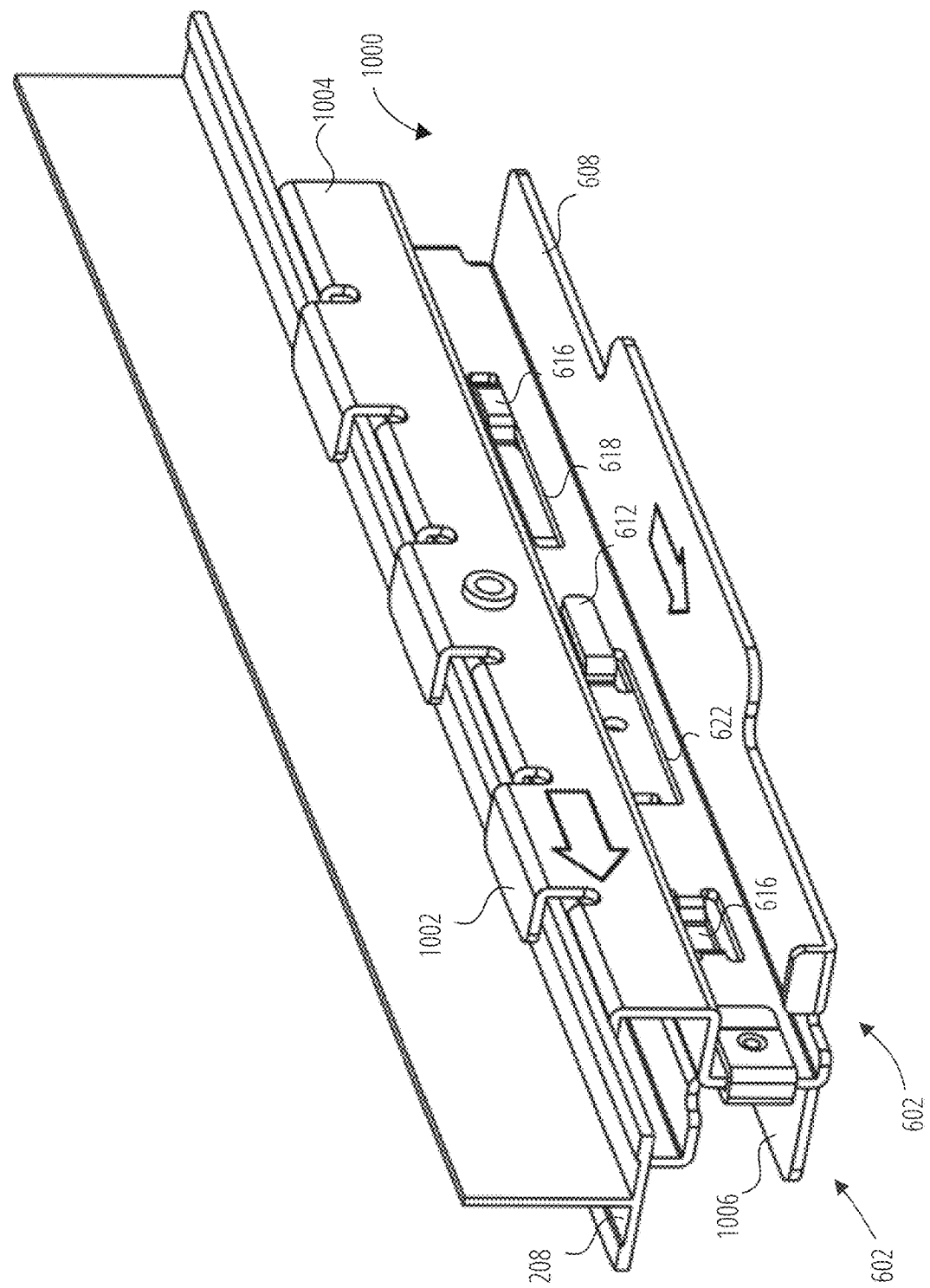
FIG. 10 is a three-dimensional view of a universal adapter forming part of a bracket assembly, according to one example embodiment, the adapter being engaged with a T-bar flange.

The bracket assembly 800 described with reference to FIG. 6 through FIG. 8 is configured to accommodating a single standard flange width. In other embodiments, the composite adapter 802 is configured to provide a universal mounting mechanism configured to be engageable with two differently sized and/or shaped structural supports or T-bars. FIG. 10 illustrates one such embodiment, in which the mounting formations of the adapter halves 602 of a composite adapter 1000 together define a flange channel 1002 (comprised of a series of laterally hook-shaped longitudinally spaced channel tabs) to receive a 9/16"T-bar flange 208.

Figure 11:
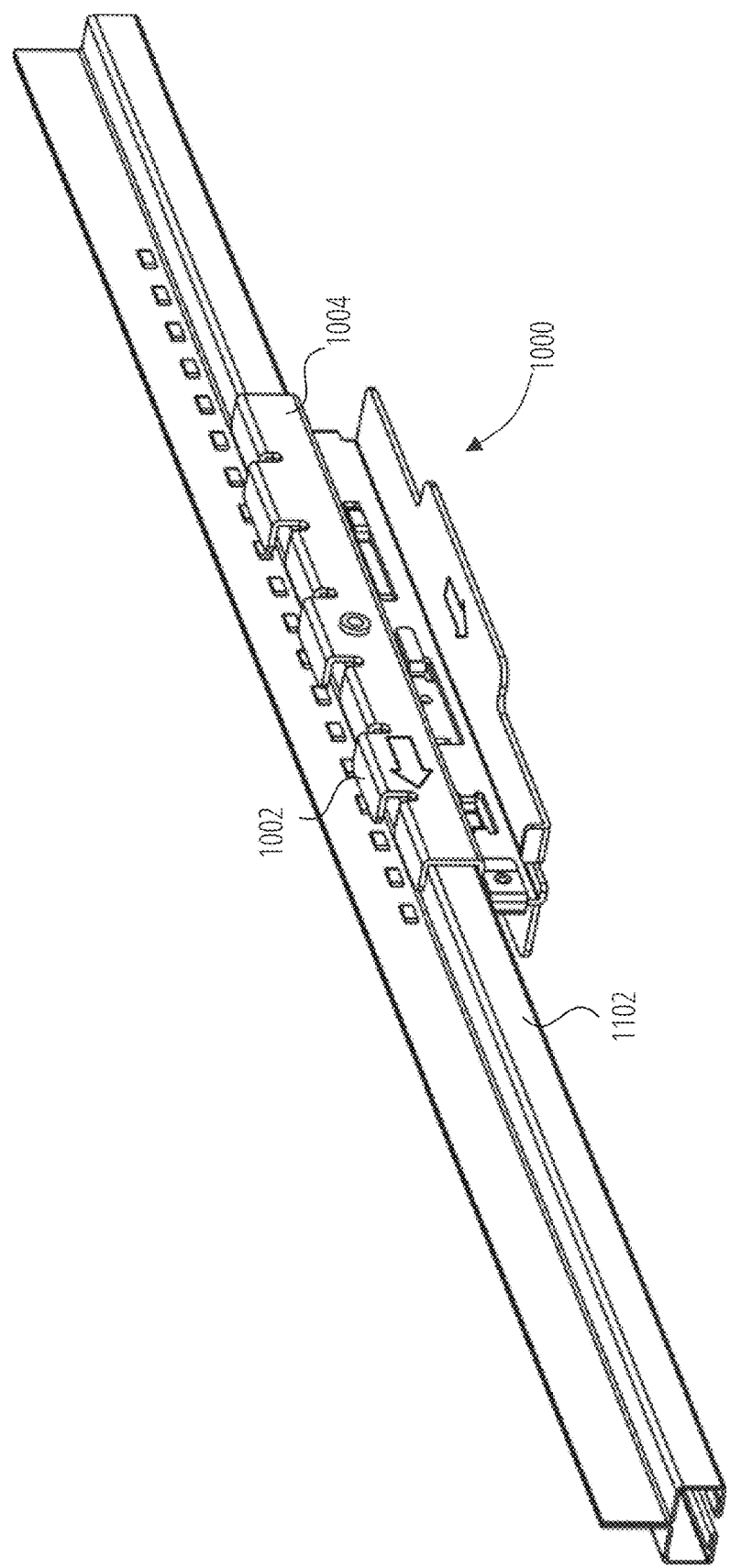
FIG. 11 is a view corresponding to FIG. 10 of the universal adapter engaged with a drop ceiling rail, according to one embodiment.

The adapter 1000 also defines, however, a rail channel 1004 for engagement with a 9/16"T-bar rail 1102, as illustrated in FIG. 11. Thus, the adapter 1000 can accommodate either the T-bar flange 208 or a T-bar rail 1102.

Figure 12:
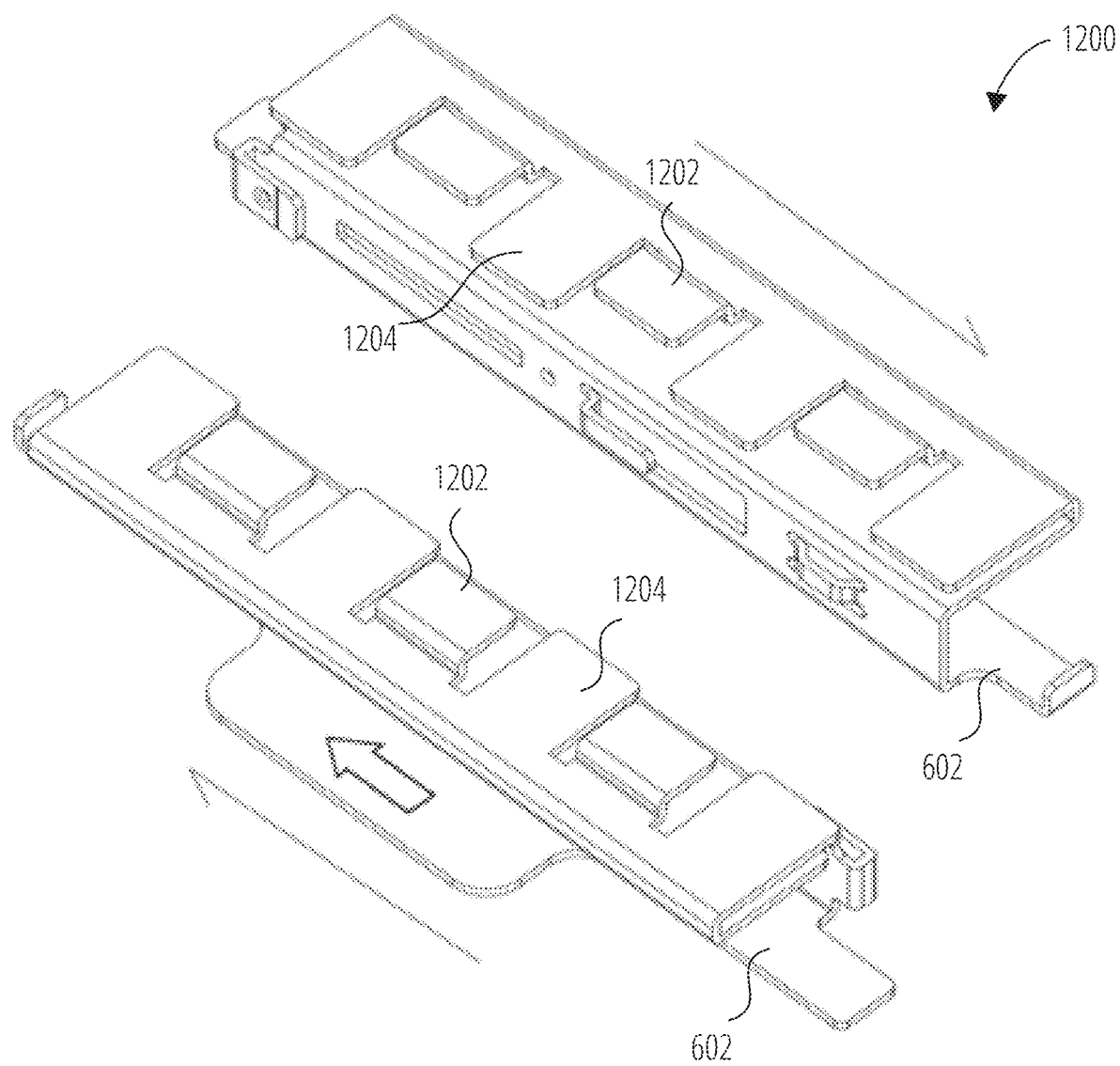
FIG. 12 is a three-dimensional view of a pair of universal adapter halves configured to accommodate flanges of two different standard widths, according to one example embodiment.

FIG. 12 illustrates an adapter kit 1200 whose halves provide a universal mounting formation configured for accommodating two different flange widths. In particular, the adapter halves 602 together define a first flange channel 1202 for receiving a 15/16"flange, and a second flange channel 1204 vertically spaced from the first flange channel 1202 for receiving a 1.5"flange.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A mounting bracket comprising:
    a bracket plate; and
    a toolless attachment mechanism incorporated in the bracket plate and configured to enable releasable toolless securing of a device to the bracket plate, the toolless attachment mechanism comprising:
        a plurality of openings extending through the bracket plate for receiving respective connectors projecting from the device; and
        a latch mechanism associated with at least one of the plurality of openings to automatically trap at least one of the respective connectors projecting from the device responsive to insertion of the at least one of the respective connectors in the at least one of the plurality of openings through the bracket plate and movement of the at least one of the respective connectors past a locking position of a non-return spring member of the latch mechanism.

2. The mounting bracket of claim 1, wherein each connector of the respective connectors projecting from the device comprises a shank and an enlarged head at an end of the shank furthest from the device;
    wherein each opening of the plurality of openings through the bracket plate comprises:
        an insertion hole shaped and sized to permit passage of the enlarged head of one of the respective connectors transversely therethrough; and
        a slot that extends from the insertion hole to allow travel along the slot of the shank of the one of the respective connectors received therein, the slot preventing passage of the enlarged head transversely therethrough; and
    wherein the latch mechanism associated with the at least one of the plurality of openings is configured to automatically trap the shank of the one of the respective connectors responsive to travel of the shank from the insertion hole along the slot past the locking position, the latch mechanism thereafter preventing travel of the trapped shank past the locking position along the slot towards the insertion hole.

3. The mounting bracket of claim 1 , wherein the non-return spring member of the latch mechanism is mounted on the bracket plate to coincide with the at least one of the plurality of openings through the bracket plate, and wherein the non-return spring member is configured to:
    deform resiliently to allow movement of the at least one of the respective connectors past the locking position in a first direction; and
    after movement of the at least one of the respective connectors past the locking position in the first direction, return resiliently to obstruct movement of the at least one of the respective connectors past the non-return spring member in a second direction opposite the first direction.

4. The mounting bracket of claim 1, further comprising a toolless fastening mechanism incorporated in the bracket plate, the fastening mechanism configured to enable releasable toolless securing of the bracket plate to a flange such that the bracket plate is suspended from the flange, wherein the fastening mechanism for securing the bracket plate to the flange comprises:
- a hanger tab that defines a flange recess configured for reception of a first longitudinal edge of the flange to suspend the bracket plate from the flange;
- a lock shoulder mounted on the bracket plate such that, when the first longitudinal edge of the flange is received in the flange recess of the hanger tab, the lock shoulder stands proud of the bracket plate adjacent an opposite, second longitudinal edge of the flange to prevent retraction of the flange from the hanger tab by contact of the second longitudinal edge of the flange against the lock shoulder, the lock shoulder being resiliently depressible to allow sliding of the flange over the lock shoulder during reception of the first longitudinal edge in the flange recess of the hanger tab; and
- a biasing mechanism that resiliently biases the lock shoulder against depression thereof and towards a raised condition, thereby enabling automatic return of the lock shoulder to the raised condition when the second longitudinal edge of the flange clears the lock shoulder.

5. The mounting bracket of claim 4, wherein the lock shoulder comprises a universal lock shoulder having two transversely spaced shoulder segments that are independently depressible and that are biased to their respective raised conditions, thereby enabling the universal lock shoulder to provide substantially play-free lateral abutment for flanges of two different widths.

6. The mounting bracket of claim 4, wherein the hanger tab forms part of a pair of hanger tabs spaced and oriented to receive the opposite longitudinal edges of the flange at longitudinally spaced positions such that the bracket plate is attachable to the flange by rotational movement of the bracket plate about an axis substantially normal to a plane of the flange.

7. The mounting bracket of claim 6, wherein the lock shoulder forms part of a pair of lock shoulders positioned on opposite sides of the flange, the lock shoulders spaced apart such that each lock shoulder is in longitudinal register with and transversely opposed to a corresponding one of the pair of lock shoulders.

8. The mounting bracket of claim 7, wherein the fastening mechanism comprises:
- a first pair of lock shoulders and an associated first pair of hanger tabs configured for together securing the bracket plate such that the flange is oriented in a first direction relative to the bracket plate; and
- a second pair of lock shoulders and an associated second pair of hanger tabs configured for together securing the bracket plate such that the flange is oriented in a second direction relative to the bracket plate, the first direction and the second direction being transverse to one another.

9. A kit for a bracket assembly to suspend a device from an elongate structural support, the kit comprising:
- a composite adapter formed by a pair of adapter parts that are configured for toolless connection to one another by longitudinal sliding engagement to resist lateral separation, each adapter part having a respective mounting formation configured for lateral reception therein of at least part of the elongate structural support to suspend the composite adapter from the structural support when both mounting formations are engaged with the structural support; and
- a mounting bracket comprising:
  - a bracket plate;
  - a fastening mechanism incorporated in the bracket plate and configured to suspend the bracket plate from the composite adapter; and
- an attachment mechanism incorporated in the bracket plate and configured to suspend the device from the bracket plate, the attachment mechanism comprising a latch mechanism associated with at least one opening of a plurality of openings extending through the bracket plate, the latch mechanism configured to automatically trap at least one connector of respective connectors projecting from the device responsive to insertion of the at least one connector into the at least one opening through the bracket plate.

10. The kit of claim 9, wherein the pair of adapter parts together define a joining mechanism configured to enable toolless joining together of the pair of adapter parts and resist lateral separation of the adapter parts to form the composite adapter;
- wherein the fastening mechanism is configured to enable releasable toolless securing of the bracket plate to the composite adapter; and
- wherein the attachment mechanism is configured to enable releasable toolless securing of the device to the bracket plate.

11. The kit of claim 9, wherein the mounting formations of the composite adapter provide a universal mounting mechanism configured to be mountable to two or more differently sized or shaped elongate structural supports.

12. The kit of claim 11, wherein the universal mounting mechanism is configured to accommodate a first T-bar type having a flange of a first standard width, and to accommodate a second T-bar type having a flange of a second standard width different from that of the first T-bar type.

13. The kit of claim 11, wherein the universal mounting mechanism is configured to accommodate a flange of an inverted T-bar, and is configured to accommodate a rail having a rectangular cross-section profile.

14. The kit of claim 9, wherein the mounting formations of the composite adapter are configured for engagement with a T-bar flange of a substantially horizontally oriented T-bar;
- wherein the composite adapter defines an adapter flange substantially parallel to and vertically spaced from the T-bar flange; and
- wherein the fastening mechanism of the mounting bracket is configured for engagement with the adapter flange to suspend the bracket plate from the composite adapter.

15. The kit of claim 9, wherein the composite adapter and the mounting bracket have complementary locking elements configured to lock the pair of adapter parts together responsive to connection of the mounting bracket to the composite adapter, such that the complementary locking elements resist longitudinal separation of the pair of adapter parts.

16. The kit of claim 9, wherein the mounting bracket includes one or more hanger tabs configured to:
- form part of the fastening mechanism to secure the mounting bracket to the composite adapter; and
- provide one or more locking elements to longitudinally lock together the pair of adapter parts.

17. A mounting bracket comprising:
- a bracket plate;
- a toolless fastening mechanism incorporated in the bracket plate, the fastening mechanism being configured to enable releasable toolless securing of the bracket plate to a flange such that the bracket plate is suspended from the flange, the toolless fastening mechanism comprising:

a hanger tab that defines a flange recess configured for reception of a first longitudinal edge of the flange to suspend the bracket plate from the flange; and a lock shoulder mounted on the bracket plate such that, when the first longitudinal edge of the flange is received in the flange recess of the hanger tab, the lock shoulder stands proud of the bracket plate adjacent an opposite, second longitudinal edge of the flange to prevent retraction of the flange from the hanger tab; and a toolless attachment mechanism incorporated in the bracket plate and configured to enable releasable toolless securing of a device to the bracket plate such that the device is suspended from the flange via the bracket plate, the toolless attachment mechanism comprising a latch mechanism associated with at least one opening of a plurality of openings extending through the bracket plate, the latch mechanism configured to automatically trap at least one connector of respective connectors projecting from the device responsive to insertion of the at least one connector into the at least one opening through the bracket plate.

18. The mounting bracket of claim 17, wherein the lock shoulder is resiliently depressible to allow sliding of the flange over the lock shoulder during reception of the first longitudinal edge in the flange recess of the hanger tab; and wherein the fastening mechanism comprises a biasing mechanism that resiliently biases the lock shoulder against depression thereof and towards a raised condition, thereby enabling automatic return of the lock shoulder to the raised condition when the second longitudinal edge of the flange clears the lock shoulder.

19. The mounting bracket of claim 17, wherein the hanger tab forms part of a pair of hanger tabs spaced and oriented to receive the opposite longitudinal edges of the flange at longitudinally spaced positions such that the bracket plate is attachable to the flange by rotational movement of the bracket plate about an axis substantially normal to a plane of the flange.

20. The mounting bracket of claim 17, wherein the at least one connector of the respective connectors projecting from the device comprises a shank and an enlarged head at an end of the shank furthest from the mounted device;

wherein the at least one opening of the plurality of openings through the bracket plate comprises:

an insertion hole shaped and sized to permit passage of the enlarged head of the at least one connector transversely therethrough; and a slot that extends from the insertion hole to allow travel along the slot of the shank of the at least one connector received therein, the slot preventing passage of the enlarged head transversely therethrough; and wherein the latch mechanism associated with the at least one opening is configured to automatically trap the shank of the at least one connector responsive to travel of the shank from the insertion hole along the slot past the locking position, the latch mechanism thereafter preventing travel of the trapped shank past the locking position along the slot towards the insertion hole.

\* \* \* \* \*